United States Patent [19]
Gaylord et al.

[11] 3,831,753
[45] Aug. 27, 1974

[54] SLOTTED IN-LINE SCREEN

[75] Inventors: Eber W. Gaylord, Pittsburgh;
Robert J. Goodwin, Oakmont;
Ernest A. Mori, Hampton
Township, all of Pa.

[73] Assignee: Gulf Research & Development
Company, Pittsburgh, Pa.

[22] Filed: Dec. 18, 1972

[21] Appl. No.: 316,348

[52] U.S. Cl................. 209/399, 175/320, 175/422
[51] Int. Cl........ B07b 1/52, E21b 7/18, E21b 17/00
[58] Field of Search........... 209/392, 394, 395, 393,
209/396, 397, 398, 399, 400, 401, 402, 403,
404, 405, 406, 407, 408; 175/54, 422, 320,
323, 324

[56] References Cited
UNITED STATES PATENTS

| 312,744 | 2/1885 | Mook | 209/398 |
| 648,588 | 5/1900 | Jensen | 209/398 |
| 667,168 | 1/1901 | Sorenson | 209/398 |
| 2,197,435 | 4/1940 | Niemeyer | 209/403 |
| 2,807,422 | 9/1957 | Ledgerwood, Jr. | 175/54 |
| 3,005,507 | 10/1961 | Clark, Jr. et al. | 175/324 |
| 3,384,192 | 5/1968 | Goodwin et al. | 175/422 |
| 3,386,580 | 6/1968 | Grabarczyk | 209/408 |
| 3,666,096 | 5/1972 | Riesbeck et al. | 209/405 X |
| 3,667,557 | 6/1972 | Todd et al. | 175/320 |

FOREIGN PATENTS OR APPLICATIONS

| 48,907 | 3/1920 | Sweden | 209/398 |
| 11,825 | 5/1909 | Great Britain | 209/398 |
| 1,498 | 12/1877 | Germany | 209/398 |

Primary Examiner—Harrison L. Hinson

[57] ABSTRACT

A strainer for preventing the passage of oversized particles suspended in an abrasive-laden liquid flowing through a conduit. The strainer consists of a pair of plates, each of which has a plurality of parallel slots extending through it. The plates are oriented with respect to one another in a manner such that the slots are at an angle, preferably of 90°, to provide openings allowing the abrasive-laden liquid to flow through the assembly. Interlocking means or cement hold the plates in the desired orientation. In a preferred embodiment of the invention, a spacer between the discs provides additional control of the size of the openings through the assembly. The plates are of tungsten carbide and preferably of a single solid piece of tungsten carbide in which the slots are cut.

10 Claims, 5 Drawing Figures

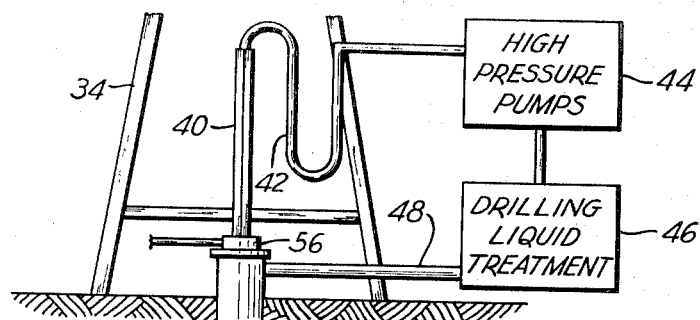
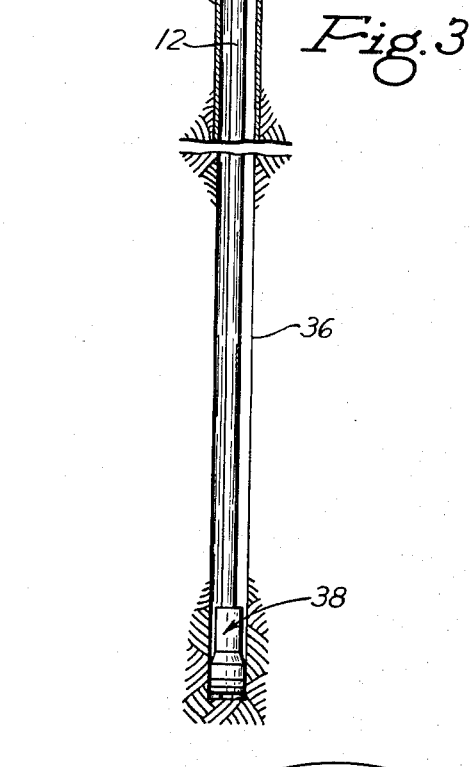
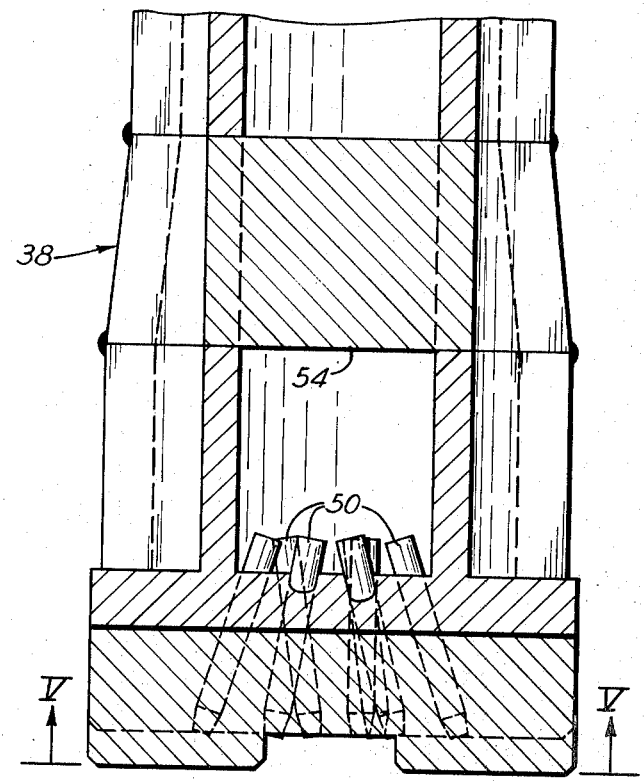
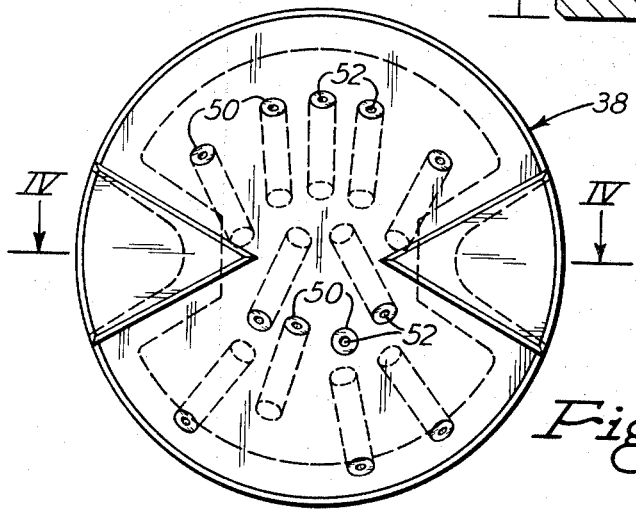

SLOTTED IN-LINE SCREEN

This invention relates to a strainer and more particularly to a strainer adapted to remove oversize particles from an abrasive-laden liquid flowing at a high velocity through a conduit.

In a recently developed drilling process an abrasive-laden liquid is discharged at very high velocities through a plurality of nozzles in a drill bit rotating at the bottom of a borehole. The preferred abrasive used in the process is steel shot or grit and the abrasive-laden slurry is discharged from the nozzles at a velocity exceeding 650 ft. per second. The abrasive-laden liquid and entrained cuttings are circulated up the annulus surrounding the drill pipe in the borehole to the surface where the abrasive-laden liquid is treated to recondition it for recirculation in the drilling process. The abrasive jet drilling process is described in U.S. Pat. No. 3,402,780 of Goodwin et al. and other United States patents. Although care is taken to prevent contamination of the drilling liquid at the surface with solid particles larger than the abrasive, complete exclusion of such particles from the drilling liquid delivered into the drill pipe does not appear to be feasible. If such particles are not removed from the abrasive-laden drilling liquid delivered to the drill bit, nozzles in the drill bit can easily become plugged and thereby greatly reduce the rate of drilling.

It has been found that higher drilling rates can be obtained for a given volume of drilling liquid circulated at a given pressure at the outlet of the pumps if the drill bit has a large number of nozzles of small diameter. It is important that the pressure drop in the drilling liquid occurs principally at the nozzles to impart the maximum velocity to the stream of drilling liquid discharged from the nozzles. The pressure drop through the nozzles must exceed about 5,000 psi to impart the desired velocity to the abrasive-laden liquid. Unfortunately, nozzles of small diameter are easily plugged, sometimes by several agglomerated abrasive particles becoming wedged in a nozzle. It is important to remove from the drilling liquid delivered to the drill bit solid particles that are only slightly larger than the abrasive particles to prevent plugging of the nozzles.

One method that has been tried to prevent large solid particles reaching the drill bit is to install an inlet screen consisting essentially of a perforated plate at some point in the drill pipe. It has been found that a perforated plate having openings small enough to remove particles that might plug the nozzle quickly becomes plugged. It has been necessary to clean in-line screens every third time a joint is added to the drill pipe.

An important part of the cost in the abrasive jet drilling process is the cost of power for pumping the large volume of drilling liquid at a high velocity and pressure down the drill pipe and through the nozzles in the drill bit. A high pressure drop across a screen in the drill string causes an important increase in the cost of the abrasive jet drilling process because that pressure drop is added to the minimum pressure drop of about 5,000 psi that must be maintained through the nozzles. If the pressure drop across a screen is reduced by increasing the number of holes in the screen, the reduced strength of the screen may result in its breaking, particularly after the screen becomes plugged. Since the openings in a perforated plate type of strainer quickly become plugged, it is essential that that type of strainer have sufficient strength to withstand a very high pressure differential across it.

This invention resides in an in-line strainer for installation in a drill string used in an abrasive jet drilling process consisting of a pair of plates placed one on top of the other in the drill string and arranged transversely to the flow of drilling liquid. Each of the plates has a plurality of elongated slots extending through it and the two plates are oriented with respect to one another in a manner such that the slots in one plate are at an angle with the slots in the other plate.

FIG. 1 of the drawings illustrates a section of a drill string including a sub in which the screen of this invention is mounted.

FIG. 3 is a diagrammatic view of a drilling rig in which the strainer of this invention is used.

FIG. 4 is a vertical sectional view of the drill bit used in the apparatus illustrated in FIG. 3.

FIG. 5 is a plan view of the bottom of the drill bit illustrated in FIG. 4.

Figure 1:
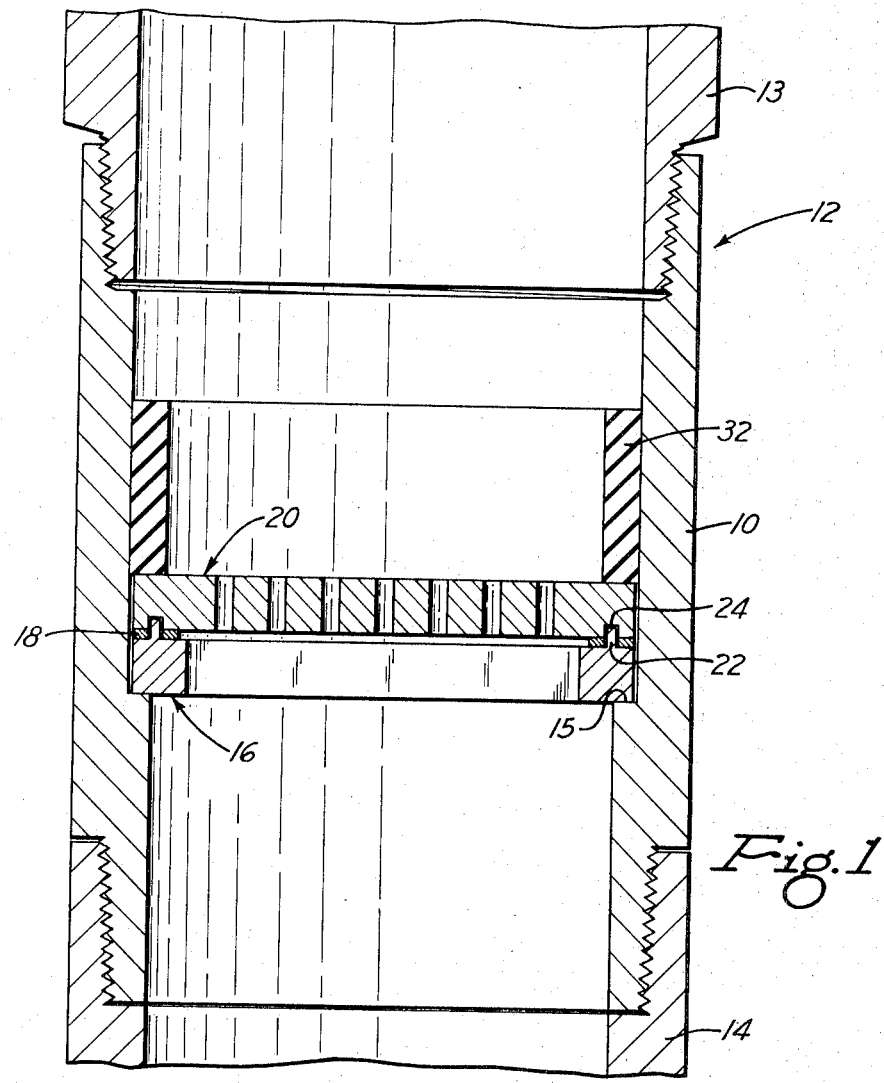
Figure 2:
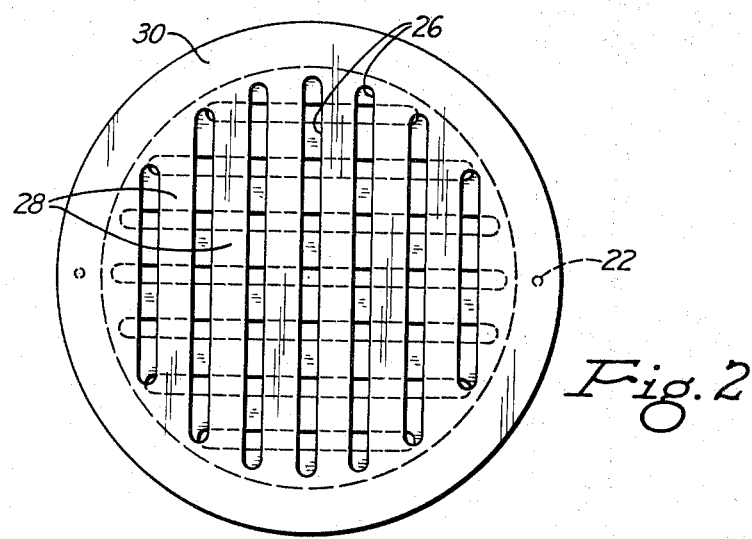
FIG. 2 is a plan view across the top of the upper plate of the screen.

Referring to FIG. 1 of the drawings, a sub 10 is shown for purposes of illustration connected in a string 12 of drill pipe between a kelly 13 and the top joint 14 of drill pipe. Resting on a shoulder 15 on the inner surface of sub 10 is a lower plate 16. A spacer 18 on the upper surface of plate 16 separates the lower plate 16 from an upper plate 20 by a desired distance. In the embodiment of the invention shown, lower plate 16 has a pair of pins 22 extending from its upper surface and through the spacer 18 into matching sockets 24 in the lower part of upper plate 20. The pin and socket arrangement holds the upper and lower plates in the desired alignment.

Each of plates 16 and 20 has a plurality of elongated slots 26 extending through the full thickness of the plate. The slots 26 are separated by webs 28 extending from a rim 30 around the outer edge of the plate. In the assembly of the strainer of this invention the upper and lower plates are oriented so that the slots in one of the plates are at an angle to the slots of the other plates. It is preferred that the slots in the upper plate be at right angles to the slots in the lower plate, and in any event the slots in one plate should be at an angle of at least 60° with the slots in the other plate. The sub 10 with the strainer consisting of the upper and lower plates may be connected at any desired position in the drill string. A preferred location is just above the uppermost joint of drill pipe in the drill string. The strainer can then be inspected easily each time a joint of drill pipe is added to the drill string. It is advantageous to use two of the strainers in the drill string; one at the top of the uppermost joint in the drill string and one just above the drill bit. The strainer at the drill bit will catch any large particles that might be broken loose from any point in the drill string below the top strainer and prevent their entering the drill bit.

Again referring to FIG. 1, a sleeve 32 of deformable material such as polyurethane or rubber rests on the upper surface of the upper plate 20 and engages the inner wall of the sub 10 to provide a seal preventing flow of abrasive particles between the outer edge of the plate and the inner wall of the sub. The arrangement illustrated in FIG. 1 utilizing the sleeve 32 and the pin 22 and socket 24 arrangement is not essential to this invention. Any interlocking arrangement can be used to maintain the orientation of the plates. For example, the desired maintenance of orientation of the upper and lower plates and prevention of leakage between the outer rim of the plates and the inner wall of the sub can be accomplished by cementing the plates in place with a suitable cement such as an epoxy cement. It then will not be necessary to use either the pin and socket arrangement or the sleeve on the upper surface of the upper plate. An O-ring seated in a groove around one of the plates has also been found to be effective in sealing the space between the outer edge of the plate and the wall of the sub.

The width of the slots in the plates will depend upon the maximum permissible solid particle size in the liquid that passes through the strainer. For example, in the abrasive jet drilling process the width of the slots 26 should be slightly less than the diameter of the nozzles in the drill bit to prevent delivery to the drill bit of solid particles large enough to plug a nozzle. Since the diameter of the nozzles in the drill bit is substantially larger than the diameter of the largest abrasive particle, the slots can have a width as much as about 2½ times the diameter of the largest abrasive particles and still protect the nozzles from large particles that might plug the nozzles. For example a strainer consisting of two plates, each having slots 0.085 inch wide, oriented with the slots in one plate at right angles to the slots in the other plate has been found to be effective in preventing plugging of nozzles three thirty-seconds inch and one-eighth inch in diameter. A typical width of the webs in plates three-fourths inch thick and having slots 0.085 inch wide is 0.150 inch. A typical size of abrasive particles used in abrasive jet drilling with bits having nozzles one-eighth inch in diameter is 18-35 mesh in the U.S. Sieve Series.

The plates comprising the strainer are subjected to severe abrasion during use. The reduction in cross-section area from the drill pipe to the slots in the plates causes an increase in velocity of the abrasive-laden liquid as it flows through the strainer. Plates constructed of a single piece of tungsten carbide alloy in which slots of the desired width and spacing are cut have been found to have a much longer life than slotted plates constructed by welding a plurality of spaced tungsten carbide bars to a tungsten carbide ring.

In the apparatus illustrated in FIG. 3, a drilling rig 34 is shown with drill string 12 extending downwardly therefrom through a borehole 36. The sub 10 in which the strainer of this invention is mounted is connected into drill string 12, as hereinbefore described. A drill bit 38 is secured to the lower end of the drill string. The upper end of the drill string 12 includes a kelly 40 which is attached at its upper end to a flexible mud line 42 from high-pressure pumps 44. The high-pressure pumps are connected to receive drilling liquid from drilling liquid treating apparatus 46 into which drilling liquid circulated from the borehole 36 is delivered through a mud line 48.

Referring to FIG. 4, drill bit 38 is shown with a plurality of nozzles 50 extending through the bottom thereof for the discharge of abrasive-laden drilling liquid against the bottom of the borehole. As shown in FIG. 5, nozzles 50 have an opening 52 therethrough for the discharge of abrasive-laden drilling liquid. The diameter of nozzles 52 is slightly larger than the width of the slots 26 in the strainer. In the particular drill bit illustrated in FIG. 4, a reinforcing web 54 extends across the central opening of the drill bit to aid in withstanding the high pressure on the drilling liquid.

In the operation of the apparatus illustrated in FIG. 3, a drilling liquid having ferrous abrasive particles suspended therein is pumped down through kelly 40 and drill string 12 to the drill bit 38. Drill string 12 is rotated by a rotary table 56 engaging the kelly. The drilling liquid is discharged from drill bit 38 through nozzles 50 at a very high velocity caused by a pressure drop ordinarily exceeding 5,000 pounds per square inch through the nozzles to erode the bottom of the borehole. Drilling liquid and formation cuttings are circulated upwardly through the annulus between the wall of borehole 36 and the drill string 12 to mud line 48 to the drilling liquid treatment in which cuttings and undersized abrasive particles are separated from the drilling liquid, and then to the high-pressure pumps for recirculation through the well.

In the operation of the strainer of this invention, the two slotted plates are connected in the abrasive-laden liquid flow line downstream of the high-pressure pumps used to deliver the abrasive-laden liquid to the drill bit under sufficient pressure to cause the abrasive-laden drilling liquid to be discharged from the nozzles in the drill bit at a velocity exceeding 650 feet per second. Solid particles having a dimension larger than the width of the slots can enter the slot only if that dimension is parallel to the length of the slot or oriented in the direction of flow of the liquid. Particles having two dimensions at right angles to one another larger than the width of the slots cannot pass through the strainer.

An important advantage of the strainer of this invention is that oversized particles do not plug the strainer and prevent flow therethrough. If a particle becomes lodged on the inlet face or in a slot of the upstream plate, the abrasive-laden liquid flows around that particle to enter that slot along the side of the lodged particle. The high velocity of the liquid in the slots, as compared to the velocity in the drill pipe, greatly increases the erosive action on lodged particles. Continued flow of the abrasive-laden liquid erodes the enlarged particle to reduce it to a size that will pass through the strainer. In contrast, if a particle becomes lodged over an opening on a perforated plate, it blocks flow of abrasive to that opening with the result that solid particles build up and plug the opening. While our experience has been that perforated plates become plugged, as indicated by an increased pressure drop or reduced volume of flow, to such an extent that they must be cleaned for every third joint added to the drill string, the strainer of this invention seldom requires cleaning and still is effective in preventing plugging of nozzles in the drill bits.

The spacers between the plates making up the strainer of this invention provide means for controlling, and reducing, the pressure drop through the strainer. In general, the spacer should have a thickness less than the width of the slots. In the strainer described above having slots 0.085 inch wide, a spacer .030 inch thick reduced the pressure drop through the strainer while still resulting in effective screening to prevent plugging of the ⅛ inch nozzles. An important advantage of the strainer of this invention is that it causes a pressure drop approximately one third less than the pressure drop in a perforated plate strainer capable of preventing nozzle plugging. Moreover, the large cross-sectional area of the slots downstream from the adjacent faces of the two slotted plates results in a reduced velocity of abrasive-laden liquid leaving the strainer, and reduced erosion of equipment immediately downstream from the strainer, as compared with a perforated plate type strainer.

We claim:

1. A strainer for removal of oversized solid particles from a fluid flowing through a conduit, the fluid having solid particles suspended therein, comprising a first plate extending across the conduit and occupying the full cross-sectional area of the conduit whereby the fluid must flow through the plate, a plurality of slots elongated in a direction transverse to the direction of flow through the conduit and extending through the plate, a second plate extending across the conduit, said spacing being less than the width of the slots parallel to the first plate and spaced therefrom a distance allowing substantial flow of fluid between the plates, a plurality of slots elongated in a direction transverse to the flow through the conduit and extending through the second plate, the slots in the second plate being of substantially the same width as the slots in the first plate and oriented with the slots in the second plate at an angle exceeding 60° to the slots in the first plate whereby the slots in the two plates intersect, and means holding the first and second plates in the desired orientation.

2. A strainer as set forth in claim 1 in which the slots in the second plate are at substantially right angles to the slots in the first plate.

3. A strainer as set forth in claim 1 in which the means holding the plates in the desired orientation comprise a projection extending from the face of one plate toward the other plate and a socket in said other plate into which the projection extends.

4. A strainer as set forth in claim 1 in which the means holding the plates in the desired orientation comprise a cement adhering to the plates and to the conduit.

5. A strainer as set forth in claim 1 in which a spacer having a thickness less than the width of the slots is between the two plates and engages the two plates to fix the distance between them.

6. In apparatus for the abrasive jet drilling of wells in which an abrasive-laden slurry is delivered through a drill string to a drill bit rotating at the bottom of the borehole for discharge at a high velocity through nozzles in the drill bit and recirculation of cuttings through the annulus between the borehole wall and the drill string to the surface, the improvement comprising a sub in the drill string, said sub having an opening defined by an inner wall extending longitudinally therethrough, a shoulder on the inner wall of the sub, a first plate supported on the shoulder, said first plate having a plurality of parallel slots extending therethrough, the slots being elongated in a direction perpendicular to the direction of flow through the opening in the sub, a second plate supported by the first plate at a distance therefrom less than the width of the slots permitting substantial flow of slurry between the plates, said second plate having a plurality of parallel slots extending therethrough, the slots in the second plate being elongated in a direction perpendicular to the direction of flow through the sub, said second plate being oriented with the slots in the second plate at an angle of at least 60° to the slots in the first plate whereby the slots intersect to form passages through the assembly of the two plates, and means holding the two plates in the desired orientation.

7. Apparatus as set forth in claim 6 in which a sleeve of deformable material is supported on the upstream face of the second plate and engages the inner wall of the sub to prevent flow between the inner wall of the sub and the plates.

8. A strainer for removing oversized solids from a fluid having solids suspended therein flowing through a conduit comprising a first plate supported within the conduit and extending across the full cross-sectional area of the conduit whereby the fluid flowing through the conduit flows through the plate, a plurality of elongated parallel slots extending through the plate, said slots being elongated in a direction perpendicular to the flow of fluid through the conduit and having a width in the range from slightly larger than the diameter of the largest solid particles desired in the fluid passing through the strainer to slightly less than the minimum diameter of the solid particles to be removed from the fluid, a second plate similar in size, shape, and width of slots to the first plate supported in the conduit adjacent the first plate with the slots in the second plate at substantially right angles to the slots in the first plate, a spacer having a thickness less than the width of the slots engaging the adjacent faces of the two plates around the periphery thereof to maintain a desired distance between the two plates allowing flow of fluid between the plates, and means for holding the two plates in the desired orientation.

9. A strainer as set forth in claim 8 in which each of the plates is a single piece of tungsten carbide alloy.

10. A strainer as set forth in claim 1 adapted for use in the abrasive jet drilling process in which each of the plates has a thickness of approximately three-fourths inch and is a single piece of a tungsten carbide alloy.

* * * * *

UNITED STATES PATENT AND TRADEMARK OFFICE
CERTIFICATE OF CORRECTION

PATENT NO. : 3,831,753
DATED : August 27, 1974
INVENTOR(S) : Eber W. Gaylord, Robert J. Goodwin, Ernest A. Mori It is certified that error appears in the above—identified patent and that said Letters Patent are hereby corrected as shown below:

Column 5, lines 16 through 19, cancel ", said spacing ... between the plates" and insert in lieu thereof --parallel to the first plate and spaced therefrom a distance allowing substantial flow of fluid between the plates, said spacing being less than the width of the slots--.

Signed and Sealed this

Fourth Day of January 1977

[SEAL]

Attest:

RUTH C. MASON
Attesting Officer

C. MARSHALL DANN
Commissioner of Patents and Trademarks